(12) United States Patent
Wang et al.

(10) Patent No.: US 9,200,125 B2
(45) Date of Patent: Dec. 1, 2015

(54) COMPOSITE MATERIAL WITH POLYAMIDE PARTICLES

(75) Inventors: Yen-Seine Wang, San Ramon, CA (US); Maureen Boyle, Castro Valley, CA (US)

(73) Assignee: Hexcel Corporation, Dublin, CA (US)

( * ) Notice: Subject to any disclaimer, the term of this patent is extended or adjusted under 35 U.S.C. 154(b) by 25 days.

(21) Appl. No.: 13/594,819

(22) Filed: Aug. 26, 2012

(65) Prior Publication Data

US 2014/0058013 A1    Feb. 27, 2014

(51) Int. Cl.
| | |
|---|---|
| C08K 7/02 | (2006.01) |
| C08L 63/00 | (2006.01) |
| C08J 5/24 | (2006.01) |
| C08J 5/04 | (2006.01) |

(52) U.S. Cl.
CPC .. *C08J 5/24* (2013.01); *C08J 5/042* (2013.01); *C08L 63/00* (2013.01); *C08J 2363/00* (2013.01); *C08J 2477/06* (2013.01)

(58) Field of Classification Search
CPC .......... C08J 5/24; C08J 5/042; C08J 2477/06; C08L 63/00
See application file for complete search history.

(56) References Cited

U.S. PATENT DOCUMENTS

| | | |
|---|---|---|
| 3,936,426 A | 2/1976 | Campbell |
| 5,696,202 A | 12/1997 | Torre |
| 6,204,355 B1 | 3/2001 | Dalla Torre |
| 7,550,190 B2 | 6/2009 | Wang et al. |
| 7,754,322 B2 | 7/2010 | Tilbrook et al. |
| 7,938,922 B2 | 5/2011 | Wang et al. |
| 7,968,179 B2 | 6/2011 | Tilbrook et al. |
| 2007/0179252 A1 | 8/2007 | Lamberts et al. |
| 2008/0081170 A1 | 4/2008 | Tilbrook et al. |
| 2010/0022742 A1 | 1/2010 | Buhler et al. |
| 2011/0135860 A1 | 6/2011 | Linemann et al. |
| 2012/0178329 A1 * | 7/2012 | Kochi et al. ................... 442/205 |
| 2013/0281573 A1 * | 10/2013 | Goto et al. ................... 523/436 |

FOREIGN PATENT DOCUMENTS

| | | |
|---|---|---|
| EP | 2412742 A1 | 2/2012 |
| JP | 2011162619 | 8/2011 |
| WO | 2012/102201 | 8/2012 |
| WO | 2013/015299 | 1/2013 |

OTHER PUBLICATIONS

PCT International Search Report for PCT/US2013/053301 issued Nov. 26, 2013.

* cited by examiner

*Primary Examiner* — Ana Woodward
(74) *Attorney, Agent, or Firm* — W. Mark Bielawski; David J. Oldenkamp

(57) ABSTRACT

Pre-impregnated composite material (prepreg) is provided that can be cured/molded to form composite parts having high compression strength under hot and wet conditions, as well as, high damage tolerance and interlaminar fracture toughness. The matrix resin includes a thermoplastic particle component that includes polyamide particles which are composed of the polymeric condensation product of a methyl derivative of bis(4-aminocyclohexyl)methane and an aliphatic dicarboxylic acid.

20 Claims, No Drawings

COMPOSITE MATERIAL WITH POLYAMIDE PARTICLES

BACKGROUND OF THE INVENTION

1. Field of the Invention

The present invention relates generally to pre-impregnated composite material (prepreg) that is used in making high performance composite parts. More particularly, the invention is directed to providing prepreg that may be cured/molded to form composite parts having high compression strength under hot and wet conditions, as well as, high damage tolerance and interlaminar fracture toughness.

2. Description of Related Art

Composite materials are typically composed of a resin matrix and reinforcing fibers as the two primary constituents. Composite materials are often required to perform in demanding environments, such as in the field of aerospace where the physical limits and characteristics of the composite part is of critical importance.

Pre-impregnated composite material (prepreg) is used widely in the manufacture of composite parts. Prepreg is a combination that typically includes uncured resin and fiber reinforcement, which is in a form that is ready for molding and curing into the final composite part. By pre-impregnating the fiber reinforcement with resin, the manufacturer can carefully control the amount and location of resin that is impregnated into the fiber network and ensure that the resin is distributed in the network as desired. It is well known that the relative amount of fibers and resin in a composite part and the distribution of resin within the fiber network have a large affect on the structural properties of the part. Prepreg is a preferred material for use in manufacturing load-bearing or primary structural parts and particularly aerospace primary structural parts, such as wings, fuselages, bulkheads and control surfaces. It is important that these parts have sufficient strength, damage tolerance and other requirements that are routinely established for such parts.

The fiber reinforcements that are commonly used in aerospace prepreg are multidirectional woven fabrics or unidirectional tape that contains fibers extending parallel to each other. The fibers are typically in the form of a bundle of numerous individual fibers or filaments that is referred to as a "tow". The fibers or tows can also be chopped and randomly oriented in the resin to form a non-woven mat. These various fiber reinforcement configurations are combined with a carefully controlled amount of uncured resin. The resulting prepreg is typically placed between protective layers and rolled up for storage or transport to the manufacturing facility.

Prepreg may also be in the form of short segments of chopped unidirectional tape that are randomly oriented to form a non-woven mat of chopped unidirectional tape. This type of prepreg is referred to as a "quasi-isotropic chopped" prepreg. Quasi-isotropic chopped prepreg is similar to the more traditional non-woven fiber mat prepreg, except that short lengths of chopped unidirectional tape (chips) are randomly oriented in the mat rather than chopped fibers.

The compression strength of a cured composite material is largely dictated by the individual properties of the reinforcing fiber and matrix resin, as well as the interaction between these two components. In addition, the fiber-resin volume ratio is an important factor. The compression strength of a composite part is typically measured at room temperature under dry conditions. However, the compression strength is also routinely measured at elevated temperature (180° F.) under wet conditions. Many parts exhibit a significant drop in compression strength under such hot and wet conditions.

In many aerospace applications, it is desirable that the composite part exhibit high compression strength under both room temperature/dry conditions and hot/wet conditions. However, attempts to keep compression strength constant under hotter/wetter conditions often result in negative effects on other desirable properties, such as damage tolerance and interlaminar fracture toughness.

Selecting higher modulus resins can be an effective way to increase the compression strength of a composite. However, this can result in a tendency to reduce damage tolerance, which is typically measured by a decrease in compressive properties, such as compression after impact (CAI) strength. Accordingly, it is very difficult to achieve a simultaneous increase in both the compression strength and damage tolerance.

Multiple layers of prepreg are commonly used to form composite parts that have a laminated structure. Delamination of such composite parts is an important failure mode. Delamination occurs when two layers debond from each other. Important design limiting factors include both the energy needed to initiate a delamination and the energy needed to propagate it. The initiation and growth of a delamination is often determined by examining Mode I and Mode II fracture toughness. Fracture toughness is usually measured using composite materials that have a unidirectional fiber orientation. The interlaminar fracture toughness of a composite material is quantified using the G1c (Double Cantilever Beam) and G2c (End Notch Flex) tests. In Mode I, the pre-cracked laminate failure is governed by peel forces and in Mode II the crack is propagated by shear forces.

A simple way to increase interlaminar fracture toughness has been to increase the ductility of the matrix resin by introducing thermoplastic sheets as interleaves between layers of prepreg. However, this approach tends to yield stiff, tack-free materials that are difficult to use. Another approach has been to include a toughened resin interlayer of about 20 to 50 microns thickness between fiber layers. The toughened resin includes thermoplastic particles. Polyamides have been used as such thermoplastic particles.

Although existing prepregs are well suited for their intended use in providing composite parts that are strong and damage tolerant, there still is a continuing need to provide prepreg that may be used to make composite parts that have even higher levels of compression strength under hot and wet conditions, high damage tolerance (CAI) and high interlaminar fracture toughness (G1c and G2c).

SUMMARY OF THE INVENTION

In accordance with the present invention, pre-impregnated composite material (prepreg) is provided that can be molded to form composite parts that have high levels of strength, damage tolerance and interlaminar fracture toughness. This is achieved without causing any substantial negative impact upon the physical or chemical characteristics of the uncured prepreg or the cured composite part.

The pre-impregnated composite materials of the present invention are composed of reinforcing fibers and a matrix. The matrix includes a resin component made up of difunctional epoxy resin in combination with one or more multifunctional epoxy resins. The matrix further includes a thermoplastic particle component, a thermoplastic toughening agent and a curing agent. As a feature of the present invention, the thermoplastic particle component is composed of thermoplastic particles that comprise a polyamide which is the polymeric condensation product of a methyl derivative of bis(4-aminocyclohexyl)methane and 1,10-decane dicarboxylic acid.

The present invention also covers methods for making the prepreg and methods for molding the prepreg into a wide variety of composite parts. The invention also covers the composite parts that are made using the improved prepreg.

It has been found that the use of matrix containing thermoplastic particles that are composed of a polyamide condensation product, as set forth above, results in the formation of prepreg that may be molded to form composite parts that have high levels of strength, damage tolerance and interlaminar fracture toughness in comparison to conventional systems.

The above described and many other features and attendant advantages of the present invention will become better understood by reference to the following detailed description.

DETAILED DESCRIPTION OF THE INVENTION

The pre-impregnated composite materials (prepreg) of the present invention may be used as a replacement for existing prepreg that is being used to form composite parts in the aerospace industry and in any other application where high structural strength and damage tolerance is required. The invention involves substituting the resin formulations of the present invention in place of existing resins that are being used to make prepreg. Accordingly, the resin formulations of the present invention are suitable for use in any of the conventional prepreg manufacturing and curing processes.

The pre-impregnated composite materials of the present invention are composed of reinforcing fibers and an uncured matrix. The reinforcing fibers can be any of the conventional fiber configurations that are used in the prepreg industry. The matrix includes a conventional resin component that is made up of difunctional epoxy resin in combination with at least one multifunctional aromatic epoxy resin with a functionality greater than two. The matrix further includes a thermoplastic particle component, a thermoplastic toughening agent and a curing agent. A feature of the present invention is that the thermoplastic particle component is composed of thermoplastic particles that comprise a polyamide which is the polymeric condensation product of a methyl derivative of bis(4-aminocyclohexyl)methane and decane dicarboxylic acid, which is also known as 1,12-dodecanedioic acid.

It was discovered that the use of polyamide particles in accordance with the present invention provided composite materials with unexpectedly high damage tolerance (CAI of over 60), as well as high compressive strength and interlaminar toughness.

The difunctional epoxy resin used to form the resin component of the matrix may be any suitable difunctional epoxy resin. It will be understood that this includes any suitable epoxy resins having two epoxy functional groups. The difunctional epoxy resin may be saturated, unsaturated, cycloaliphatic, alicyclic or heterocyclic.

Difunctional epoxy resins, by way of example, include those based on: diglycidyl ether of Bisphenol F, Bisphenol A (optionally brominated), glycidyl ethers of phenol-aldelyde adducts, glycidyl ethers of aliphatic diols, diglycidyl ether, diethylene glycol diglycidyl ether, Epikote, Epon, aromatic epoxy resins, epoxidised olefins, brominated resins, aromatic glycidyl amines, heterocyclic glycidyl imidines and amides, glycidyl ethers, fluorinated epoxy resins, or any combination thereof. The difunctional epoxy resin is preferably selected from diglycidyl ether of Bisphenol F, diglycidyl ether of Bisphenol A, diglycidyl dihydroxy naphthalene, or any combination thereof. Most preferred is diglycidyl ether of Bisphenol F. Diglycidyl ether of Bisphenol F is available commercially from Huntsman Advanced Materials (Brewster, N.Y.) under the trade names Araldite GY281 and GY285 and from Ciba-Geigy (location) under the trade name LY9703. A difunctional epoxy resin may be used alone or in any suitable combination with other difunctional epoxies.

The difunctional epoxy resin is present in the range 10 wt % to 40 wt % of the matrix. Preferably, the difunctional epoxy resin is present in the range 15 wt % to 35 wt %. More preferably, the difunctional epoxy resin is present in the range 20 wt % to 25 wt %.

The second component of the matrix is one or more epoxy resins with a functionality that is greater than two. Preferred multifunctional epoxy resins are those that are trifunctional or tetrafunctional. The multifunctional epoxy resin may be a combination of trifunctional and multifunctional epoxies. The multifunctional epoxy resins may be saturated, unsaturated, cylcoaliphatic, alicyclic or heterocyclic.

Suitable multifunctional epoxy resins, by way of example, include those based upon: phenol and cresol epoxy novolacs, glycidyl ethers of phenol-aldehyde adducts; glycidyl ethers of dialiphatic diols; diglycidyl ether; diethylene glycol diglycidyl ether; aromatic epoxy resins; dialiphatic triglycidyl ethers, aliphatic polyglycidyl ethers; epoxidised olefins; brominated resins; aromatic glycidyl amines; heterocyclic glycidyl imidines and amides; glycidyl ethers; fluorinated epoxy resins or any combination thereof.

A trifunctional epoxy resin will be understood as having the three epoxy groups substituted either directly or indirectly in a para or meta orientation on the phenyl ring in the backbone of the compound. A tetrafunctional epoxy resin will be understood as having the four epoxy groups substituted either directly or indirectly in a meta or para orientation on the phenyl ring in the backbone of the compound.

The phenyl ring may additionally be substituted with other suitable non-epoxy substituent groups. Suitable substituent groups, by way of example, include hydrogen, hydroxyl, alkyl, alkenyl, alkynyl, alkoxyl, aryl, aryloxyl, aralkyloxyl, aralkyl, halo, nitro, or cyano radicals. Suitable non-epoxy substituent groups may be bonded to the phenyl ring at the para or ortho positions, or bonded at a meta position not occupied by an epoxy group. Suitable tetrafunctional epoxy resins include N,N,N',N'-tetraglycidyl-m-xylenediamine (available commercially from Mitsubishi Gas Chemical Company (Chiyoda-Ku, Tokyo, Japan) under the name Tetrad-X), and Erisys GA-240 (from CVC Chemicals, Morrestown, N.J.). Suitable trifunctional epoxy resins, by way of example, include those based upon: phenol and cresol epoxy novolacs; glycidyl ethers of phenol-aldehyde adducts; aromatic epoxy resins; dialiphatic triglycidyl ethers; aliphatic polyglycidyl ethers; epoxidised olefins; brominated resins, aromatic glycidyl amines and glycidyl ethers; heterocyclic glycidyl imidines and amides; glycidyl ethers; fluorinated epoxy resins or any combination thereof.

An exemplary trifunctional epoxy resin is triglycidyl meta-aminophenol. Triglycidyl meta-aminophenol is available commercially from Huntsman Advanced Materials (Monthey, Switzerland) under the trade name Araldite MY0600 and from Sumitomo Chemical Co. (Osaka, Japan) under the trade name ELM-120. Another exemplary trifunctional epoxy resin is triglycidyl para-aminophenol. Triglycidyl para-aminophenol is available commercially from Huntsman Advanced Materials (Monthey, Switzerland) under the trade name Araldite MY0510.

Additional examples of suitable multifunctional epoxy resin include, by way of example, N,N,N',N'-tetraglycidyl-4,4'-diaminodiphenyl methane (TGDDM available commercially as Araldite MY720 and MY721 from Huntsman Advanced Materials (Monthey, Switzerland), or ELM 434 from Sumitomo), triglycidyl ether of para aminophenol (available commercially as Araldite MY 0500 or MY 0510 from Huntsman Advanced Materials), dicyclopentadiene based epoxy resins such as Tactix 556 (available commercially from Huntsman Advanced Materials), tris-(hydroxyl phenyl), and methane-based epoxy resin such as Tactix 742 (available commercially from Huntsman Advanced Materials). Other suitable multifunctional epoxy resins include DEN 438 (from Dow Chemicals, Midland, Mich.), DEN 439 (from Dow Chemicals), Araldite ECN 1273 (from Huntsman Advanced Materials), and Araldite ECN 1299 (from Huntsman Advanced Materials).

Preferably, the epoxy resin(s) with a functionality that is greater than 2 will be present in the range 15 wt % to 35 wt % of the matrix. More preferably, the difunctional epoxy resin is present in the range of 20 wt % to 25 wt % of the total weight of the matrix. The total resin component content resin (difunctional+trifunctional+tetrafunctional) will be in the range 40 wt % to 60 wt % of the total matrix.

The prepreg matrix in accordance with the present invention also includes a thermoplastic particle component that is composed of polyamide particles which are a polymeric condensation product of a methyl derivative of bis(4-aminocyclohexyl)methane and an aliphatic dicarboxylic acid selected from the group consisting of decane dicarboxylic acid and dodecane dicarboxylic acid. Methyl derivatives of bis(4-aminocyclohexyl)methane, which are referred to herein as the "amine component" are also known as methyl derivatives of 4,4'-diaminocyclohexylmethane.

The polyamide particles and the methods for making them are described in detail in U.S. Pat. Nos. 3,936,426 and 5,696,202, the contents of which are hereby incorporated by reference.

The formula for the amine component of the polymeric condensation product is

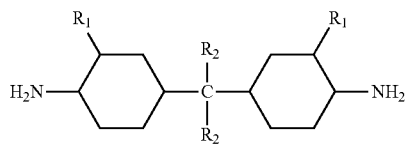

where $R_2$ is hydrogen, methyl or ethyl and $R_1$ is methyl, ethyl or hydrogen wherein at least one of $R_1$ is methyl or ethyl. A preferred amine component is where both $R_1$ are methyl and both $R_2$ are hydrogen.

The preferred polyamide particles are made from the polymeric condensation product of 3,3'-dimethyl-bis(4-aminocyclohexyl)methane ($R_1$ both are methyl and $R_2$ both are hydrogen) and 1,10-decane dicarboxylic acid. The preferred polyamide particles are made by combining, in a heated receiving vessel, 13,800 grams of 1,10-decane dicarboxylic acid and 12,870 grams of 3,3'-dimethyl-bis(4-aminocyclohexyl)methane with 30 grams of 50% aqueous phosphoric acid, 150 grams benzoic acid and 101 grams of water. The mixture is stirred in a pressure autoclave until homogeneous. After a compression, decompression and degassing phase, the polyamide condensation product is pressed out as a strand, passed under cold water and granulated to form polyamide particles. Preferred polyamide particles can also be made from GRILAMID TR90, which is commercially available from EMS-Chime (Sumter, S.C.). GRILAMID TR90 is the polymeric condensation product of 3,3'-dimethyl-bis(4-aminocyclohexyl)methane and 1,10-decane dicarboxylic acid.

The formula for the monomeric unit of the preferred polymeric condensation product may be represented as follows:

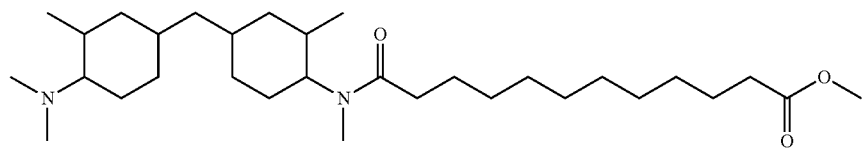

The molecular number of the preferred polymeric condensation product will range from 14,000 to 20,000 with a molecular numbers of about 17,000 being particularly preferred.

The polyamide particles should have particle sizes of below 100 microns. It is preferred that the particles range in size from 5 to 60 microns and more preferably from 10 to 30 microns. It is preferred that the average particle size is from 15 to 25 microns. The particles may be regular or irregular in shape. For example, the particles may be substantially spherical or they can be particles with a jagged shape.

The thermoplastic particle component is present in the range 5 wt % to 20 wt % of the matrix. Preferably, there will be from 5 to 15 wt % thermoplastic particles. At least 40 wt % of the thermoplastic particles in the thermoplastic particle component should be composed of polyamide condensation product in accordance with the present invention, as described above. Preferably, the amount of polyamide condensation product particles in the thermoplastic component will be over 50 wt % with amounts of such polyamide particles above 95 wt % being particularly preferred. Up to 60 wt % of other thermoplastic particles, such as other types of polyamide particles, may be included in the thermoplastic component, if desired. For example, see U.S. Pat. No. 7,754,322, the contents of which is hereby incorporated by reference, for other types of polyamide particles that can be used. Preferably, the amount of other types of polyamide particles will be below 50 wt % of the thermoplastic component. Particularly preferred are thermoplastic components that include amounts of other polyamide particles of less than 5 wt %.

The individual polyamide particles made from the condensation product, as described above, should contain at least 90 wt % of the condensation product. Preferably, the polyamide particles should contain at least 95 wt % of the condensation product and more preferably at least 98 wt % of the condensation product.

The prepreg matrix resin includes at least one curing agent. Suitable curing agents are those which facilitate the curing of the epoxy-functional compounds of the invention and, particularly, facilitate the ring opening polymerization of such epoxy compounds. In a particularly preferred embodiment, such curing agents include those compounds which polymerize with the epoxy-functional compound or compounds, in the ring opening polymerization thereof. Two or more such curing agents may be used in combination.

Suitable curing agents include anhydrides, particularly polycarboxylic anhydrides, such as nadic anhydride (NA), methylnadic anhydride (MNA—available from Aldrich), phthalic anhydride, tetrahydrophthalic anhydride, hexahydrophthalic anhydride (HHPA—available from Anhydrides and Chemicals Inc., Newark, N.J.), methyltetrahydrophthalic anhydride (MTHPA—available from Anhydrides and Chemicals Inc.), methylhexahydrophthalic anhydride (MHHPA—available from Anhydrides and Chemicals Inc.), endomethylenetetrahydrophthalic anhydride, hexachloroendomethylene-tetrahydrophthalic anhydride (Chlorentic Anhydride—available from Velsicol Chemical Corporation, Rosemont, Ill.), trimellitic anhydride, pyromellitic dianhydride, maleic anhydride (MA—available from Aldrich), succinic anhydride (SA), nonenylsuccinic anhydride, dodecenylsuccinic anhydride (DDSA—available from Anhydrides and Chemicals Inc.), polysebacic polyanhydride, and polyazelaic polyanhydride.

Further suitable curing agents are the amines, including aromatic amines, e.g., 1,3-diaminobenzene, 1,4-diaminobenzene, 4,4'-diamino-diphenylmethane, and the polyaminosulphones, such as 4,4'-diaminodiphenyl sulphone (4,4'-DDS—available from Huntsman), 4-aminophenyl sulphone, and 3,3'-diaminodiphenyl sulphone (3,3'-DDS). Also, suitable curing agents may include polyols, such as ethylene glycol (EG—available from Aldrich), poly(propylene glycol), and polyvinyl alcohol); and the phenol-formaldehyde resins, such as the phenol-formaldehyde resin having an average molecular weight of about 550-650, the p-t-butylphenol-formaldehyde resin having an average molecular weight of about 600-700, and the p-n-octylphenol-formaldehyde resin, having an average molecular weight of about 1200-1400, these being available as HRJ 2210, HRJ-2255, and SP-1068, respectively, from Schenectady Chemicals, Inc., Schenectady, N.Y.). Further as to phenol-formaldehyde resins, a combination of CTU guanamine, and phenol-formaldehyde resin having a molecular weight of 398, which is commercially available as CG-125 from Ajinomoto USA Inc. (Teaneck, N.J.), is also suitable.

Different commercially available compositions may be used as curing agents in the present invention. One such composition is AH-154, a dicyanodiamide type formulation, available from Ajinomoto USA Inc. Others which are suitable include Ancamide 400, which is a mixture of polyamide, diethyltriamine, and triethylenetetraamine, Ancamide 506, which is a mixture of amidoamine, imidazoline, and tetraethylenepentaamine, and Ancamide 1284, which is a mixture of 4,4'-methylenedianiline and 1,3-benzenediamine; these formulations are available from Pacific Anchor Chemical, Performance Chemical Division, Air Products and Chemicals, Inc., Allentown, Pa.

Additional suitable curing agents include imidazole (1,3-diaza-2,4-cyclopentadiene) available from Sigma Aldrich (St. Louis, Mo.), 2-ethyl-4-methylimidazole available from Sigma Aldrich, and boron trifluoride amine complexes, such as Anchor 1170, available from Air Products & Chemicals, Inc.

Still additional suitable curing agents include 3,9-bis(3-aminopropyl-2,4,8,10-tetroxaspiro[5.5]undecane, which is commercially available as ATU, from Ajinomoto USA Inc., as well as aliphatic dihydrazide, which is commercially available as Ajicure UDH, also from Ajinomoto USA Inc., and mercapto-terminated polysulphide, which is commercially available as LP540, from Morton International, Inc., Chicago, Ill.

The curing agent(s) is selected so that it provides curing of the matrix at suitable temperatures. The amount of curing agent required to provide adequate curing of the matrix will vary depending upon a number of factors including the type of resin being cured, the desired curing temperature and curing time. Curing agents typically may also include cyanoguanidine, aromatic and aliphatic amines, acid anhydrides, Lewis Acids, substituted ureas, imidazoles and hydrazines. The particular amount of curing agent required for each particular situation may be determined by well-established routine experimentation.

Exemplary preferred curing agents include 4,4'-diaminodiphenyl sulphone (4,4'-DDS) and 3,3'-diaminodiphenyl sulphone (3,3'-DDS), both commercially available from Huntsman.

The curing agent is present in an amount that ranges from 5 wt % to 45 wt % of the uncured matrix. Preferably, the curing agent is present in an amount that ranges from 10 wt % to 30 wt %. More preferably, the curing agent is present in the range 15 wt % to 25 wt % of the uncured matrix. Most preferred is a matrix that contains from 18 wt % to 22 wt % curing agent based on the total weight of the matrix.

3,3'-DDS is a particularly preferred curing agent. It is preferably used as the sole curing agent in an amount ranging from 18 wt % to 22 wt %. Small amounts (less than 2 wt %) of other curatives, such as 4,4'-DDS, may be included, if desired.

The matrix of the present invention also preferably includes a thermoplastic toughening agent. Any suitable thermoplastic polymers may be used as the toughening agent. Typically, the thermoplastic polymer is added to the resin mix as particles that are dissolved in the resin mixture by heating prior to addition of the curing agent. Once the thermoplastic agent is substantially dissolved in the hot matrix resin precursor (i.e. the blend of epoxy resins), the precursor is cooled and the remaining ingredients (curing agent and insoluble thermoplastic particles) are added.

Exemplary thermoplastic toughening agents/particles include any of the following thermoplastics, either alone or in combination: polysulphones, polyethersulfonones, high performance hydrocarbon polymers, elastomers, and segmented elastomers.

The toughening agent is present in the range 10 wt % to 40 wt % of the uncured resin matrix. Preferably, the toughening agent is present in the range 15 wt % to 30 wt %. More preferably, the toughening agent is present in the range 20 wt % to 25 wt %. A suitable toughening agent, by way of example, is particulate PES sold under the trade name Sumikaexcel 5003P, which is commercially available from Sumitomo Chemicals. Alternatives to 5003P are Solvay polyethersulphone 105RP, or the non-hydroxyl terminated grades such as Solvay 1054P. Densified PES particles may be used as the toughening agent. The form of the PES is not particularly important since the PES is dissolved during formation of the resin. Densified PES particles can be made in accordance with the teachings of U.S. Pat. No. 4,945,154, the contents of which are hereby incorporated by reference. Densified PES particles are also available commercially from Hexcel Corporation (Dublin, Calif.) under the trade name HRI-1. The average particle size of the toughening agent should be less than 100 microns to promote and insure complete dissolution of the PES in the matrix.

The matrix may also include additional ingredients, such as performance enhancing or modifying agents and additional thermoplastic polymers provided they do not adversely affect the tack and outlife of the prepreg or the strength and damage tolerance of the cured composite part. The performance enhancing or modifying agents, for example, may be selected from flexibilizers, non-particulate toughening agents, accelerators, core shell rubbers, flame retardants, wetting agents, pigments/dyes, UV absorbers, anti-fungal compounds, fillers, conducting particles, and viscosity modifiers.

Suitable accelerators are any of the urone compounds that have been commonly used. Specific examples of accelerators, which may be used alone or in combination, include N,N-dimethyl, N'-3,4-dichlorophenyl urea (Diuron), N'-3-chlorophenyl urea (Monuron), and preferably N,N-(4-methyl-m-phenylene bis[N',N'-dimethylurea] (e.g. Dyhard UR500 available from Degussa).

Suitable fillers include, by way of example, any of the following either alone or in combination: silicas, aluminas, titania, glass, calcium carbonate and calcium oxide.

Suitable conducting particles, by way of example, include any of the following either alone or in combination: silver, gold, copper, aluminum, nickel, conducting grades of carbon, buckminsterfullerene, carbon nanotubes and carbon nanofibres. Metal-coated fillers may also be used, for example nickel coated carbon particles and silver coated copper particles.

The matrix may include small amounts (less than 5 wt %) of an additional non-epoxy thermosetting polymeric resin. Once cured, a thermoset resin is not suitable for melting and remolding. Suitable non-epoxy thermoset resin materials for the present invention include, but are not limited to, resins of phenol formaldehyde, urea-formaldehyde, 1,3,5-triazine-2,4,6-triamine (Melamine), bismaleimide, vinyl ester resins, benzoxazine resins, phenolic resins, polyesters, cyanate ester resins, epoxide polymers, or any combination thereof. The thermoset resin is preferably selected from epoxide resins, cyanate ester resins, benzoxazine and phenolic resins. If desired, the matrix may include further suitable resins containing phenolic groups, such as resorcinol based resins, and resins formed by cationic polymerization, such as DCPD—phenol copolymers. Still additional suitable resins are melamine-formaldehyde resins, and urea-formaldehyde resins.

The resin matrix is made in accordance with standard prepreg matrix processing. In general, the various epoxy resins are mixed together at room temperature to form a resin mix to which the thermoplastic toughening agent is added. This mixture is then heated to about 120° C. for about 1 to 2 hours to dissolve the thermoplastic toughening. The mixture is then cooled down to about 80° C. and the remainder of the ingredients (thermoplastic particle component, curing agent and other additive, if any) is mixed into the resin to form the final matrix resin that is impregnated into the fiber reinforcement.

The matrix resin is applied to the fibrous reinforcement in accordance with any of the known prepreg manufacturing techniques. The fibrous reinforcement may be fully or partially impregnated with the matrix resin. In an alternate embodiment, the matrix resin may be applied to the fiber fibrous reinforcement as a separate layer, which is proximal to, and in contact with, the fibrous reinforcement, but does not substantially impregnate the fibrous reinforcement. The prepreg is typically covered on both sides with a protective film and rolled up for storage and shipment at temperatures that are typically kept well below room temperature to avoid premature curing. Any of the other prepreg manufacturing processes and storage/shipping systems may be used if desired.

The fibrous reinforcement of the prepreg may be selected from hybrid or mixed fiber systems that comprise synthetic or natural fibers, or a combination thereof. The fibrous reinforcement may preferably be selected from any suitable material such as fiberglass, carbon or aramid (aromatic polyamide) fibers. The fibrous reinforcement is preferably carbon fibers.

The fibrous reinforcement may comprise cracked (i.e. stretch-broken) or selectively discontinuous fibers, or continuous fibers. It is envisaged that use of cracked or selectively discontinuous fibers may facilitate lay-up of the composite material prior to being fully cured, and improve its capability of being shaped. The fibrous reinforcement may be in a woven, non-crimped, non-woven, unidirectional, or multi-axial textile structure form, such as quasi-isotropic chopped prepreg. The woven form may be selected from a plain, satin, or twill weave style. The non-crimped and multi-axial forms may have a number of plies and fiber orientations. Such styles and forms are well known in the composite reinforcement field, and are commercially available from a number of companies, including Hexcel Reinforcements (Villeurbanne, France).

The prepreg may be in the form of continuous tapes, towpregs, webs, or chopped lengths (chopping and slitting operations may be carried out at any point after impregnation). The prepreg may be an adhesive or surfacing film and may additionally have embedded carriers in various forms both woven, knitted, and non-woven. The prepreg may be fully or only partially impregnated, for example, to facilitate air removal during curing.

An exemplary preferred matrix resin includes from 20 wt % to 25 wt % Bisphenol-F diglycidyl ether; from 20 wt % to 25 wt % triglycidyl-p-aminophenol (trifunctional epoxy resin); from 17 wt % to 22 wt % diaminodiphenylsulphone (primarily 3,3-DDS as a curing agent); from 10 wt % to 15 wt % polyamide particles that are a polymeric condensation product of 3,3'-dimethyl-bis(4-aminocyclohexyl)methane and dodecane dicarboxylic acid; and from 10 wt % to 26 wt % ground densified polyether sulphone as a toughening agent.

The prepreg may be molded using any of the standard techniques used to form composite parts. Typically, one or more layers of prepreg are place in a suitable mold and cured to form the final composite part. The prepreg of the invention may be fully or partially cured using any suitable temperature, pressure, and time conditions known in the art. Typically, the prepreg will be cured in an autoclave at temperatures of between 160° C. and 190° C. The composite material may be cured using a method selected from microwave radiation, electron beam, gamma radiation, or other suitable thermal or non-thermal radiation.

Composite parts made from the improved prepreg of the present invention will find application in making articles such as numerous primary and secondary aerospace structures (wings, fuselages, bulkheads and the like), but will also be useful in many other high performance composite applications including automotive, rail and marine applications where high compressive strength, interlaminar fracture toughness and resistance to impact damage are needed.

In order that the present invention may be more readily understood, reference will now be made to the following background information and examples of the invention.

Example 1

A preferred exemplary resin formulation in accordance with the present invention is set forth in TABLE 1. A matrix resin was prepared by mixing the epoxy ingredients at room temperature with the polyethersulfone to form a resin blend that was heated to 130° C. for 60 minutes to completely dissolve the polyethersulfone. The mixture was cooled to 80° C. and the rest of the ingredients added and mixed in thoroughly.

TABLE 1

| Ingredient | Amount (Wt %) |
|---|---|
| Bisphenol-F diglycidyl ether (LY9703) | 22.5 |
| Trifunctional para-glycidyl amine (MY0510) | 22.5 |
| Aromatic diamine curing agent (3,3-DDS) | 19.6 |
| Thermoplastic Toughening Agent (HRI-1 polyether sulfone) | 23.4 |
| Polyamide particles (25 microns) that are a polymeric condensation product of 3,3'-dimethyl-bis(4-aminocyclohexyl)methane and 1,10-decane dicarboxylic acid (GRILAMID TR90) | 12.0 |

Exemplary prepreg was prepared by impregnating one or more layers of unidirectional carbon fibers with the resin formulation of TABLE 1. The unidirectional carbon fibers (IM7 available from Hexcel Corporation) were used to make a prepreg in which the matrix resin amounted to 35 weight percent of the total uncured prepreg weight and the fiber areal weight was 145 grams per square meter (gsm). A variety of prepreg lay ups were prepared using standard prepreg fabrication procedures. The prepregs were cured in an autoclave at 180° C. for about 2 hours. The cured prepregs were then subjected to standard tests to determine their tolerance to damage (CAI), interlaminar fracture toughness (G1c and G2c) and compressive strength under both room temperature/dry conditions and 180° F./wet conditions, as described below.

Compression after Impact (CAI) was determined using a 270 in-lb impact against a 4-ply quasi-isotropic laminate. The laminate was cured at 180° C. for 2 hours in the autoclave. The final laminate thickness was about 4.5 mm. The consolidation was verified by c-scan. The specimens were machined, impacted and tested in accordance with Boeing test method BSS7260 per BMS 8-276. Values are normalized to a nominal cured laminate thickness of 0.18 inches.

G1c and G2c are standard tests that provide a measure of the interlaminar fracture toughness of the cured laminate. G1c and G2c were determined as follows. A 4-ply unidirectional laminate was cured with a 3 inch fluoroethylene polymer (FEP) film inserted along one edge, at the mid-plane of the layup, perpendicular to the fiber direction to act as a crack starter. The laminate was cured for 2 hours at 180° C., in an autoclave and gave a nominal thickness of 3.8 mm. Consolidation was verified by C-scan. Both G1c and G2c samples were machined from the same cured laminate. G1c was tested in accordance with Boeing test method BSS7233 and G2c was tested in accordance with BSS7320. Values for G1c and G2c were not normalized.

The 0° Compressive strength at room temperature under dry conditions was determined according to BS7260. The 0° Compressive strength at 180° F. under wet conditions was also determined according to BSS7260.

Surprisingly, the CAI was determined to be 61.3. Since this is a relatively high and unexpected CAI level, a second sample was retested to confirm the test result. Upon retesting, the CAI of the laminate was found to be 60.1, which is well within expected experimental error. The CAI of over 60 is very high in comparison to laminates made using polyamide tougheners other than TR90. The G1c and G2c values were relatively high at 2.8 and 8.8, respectively. The 0° compressive strength was 259 at room temperature under dry conditions, which is relatively high. The 0° compressive strength remained relative high (189) when measured at 180° C. under wet conditions.

The above example demonstrates that an unexpectedly high damage tolerance (CAI) in combination with high interlaminar fracture toughness and compressive strength can be achieved when polyamide particles in accordance with the present invention are used in the matrix.

Comparative Example 1

A comparative prepreg was prepared and cured in the same manner as Example 1. A matrix formulation was used in which the thermoplastic component contained polyamide particles that are available commercially from Arkema (France) under the trade names Orgasol 1002 and Orgasol 3803. Orgasol 1002 is composed of 100% PA6 particles having an average particle size of 20 microns. Orgasol 3803 is composed of particles that are a copolymer of 80% PA12 and 20% PA6 with the mean particle size being from 17 to 24 microns. The prepreg was prepared using the same IM7 carbon fiber. The prepreg contained 35% resin by weight and had a fiber areal weight of 145 gsm. The formulation used for the comparative prepreg is set forth in TABLE 2.

TABLE 2

| Ingredient | Amount (wt %) |
|---|---|
| Bisphenol-F diglycidyl ether (GY285) | 17.3 |
| Trifunctional meta-glycidyl amine (MY0600) | 26.2 |
| N,N,N',N'-tetraglycidyl-4,4'-diaminodiphenyl methane (MY721) | 10.5 |
| PES (5003P) | 15.7 |
| 4,4-DDS | 20.9 |
| Polyamide 12 Particles (Orgasol 1002) | 4.75 |
| Polyamide 12 Particles (Orgasol 3803) | 4.75 |

The cured comparative prepreg was tested in the same manner as Example 1. The CAI was 57.9 and the G1c and G2c were 2.1 and 7.3, respectively. The 0° compressive strength at room temperature was 269. The 0° compressive strength fell to 160 when measured at 180° C. under wet conditions. Use of the polyamide condensation product particles in accordance with the present invention avoids this substantial drop in compressive strength that occurred under hot and wet conditions.

Example 2

Additional exemplary prepregs were prepared in the same manner as Example 1, except that the fiber reinforcement was IM10. IM10 is a unidirectional carbon fiber material which is also available from Hexcel Corporation (Dublin, Calif.). The exemplary matrix formulations are set forth in TABLE 3. The exemplary prepregs included matrix resin in an amount of 35 weight percent of the total uncured prepreg weight and the fiber areal weight of the IM10 fiber was 145 grams per square meter (gsm). SP 10L are PA12 polyamide particles) that are available commercially from Toray Industries (Japan).

TABLE 3

| Ingredient | 2A (wt %) | 2B (wt %) |
|---|---|---|
| GY285 | 17.0 | 16.6 |
| MY0600 | 25.7 | 25.1 |
| MY721 | 10.3 | 10.1 |
| PES 5003P | 18.7 | 18.7 |

TABLE 3-continued

| Ingredient | 2A (wt %) | 2B (wt %) |
|---|---|---|
| TR90 (25 microns) | 4.75 | 6.75 |
| SP10L | 6.25 | 6.25 |
| 3,3-DDS | 20.6 | 20.1 |

The cured exemplary prepregs were subjected to the same testing procedures as in Example 1. The results are set forth in TABLE 4.

TABLE 4

|  | 2A | 2B |
|---|---|---|
| CAI | 57.6 | 59.2 |
| G1c | 2.3 | 2.2 |
| G2c | 12.2 | 3.0 |
| 0° Comp. Strength (RT/dry) | 280 | 271 |
| 0° Comp. Strength (180° C./wet) | 187 | 187 |

Examples 2A and 2B demonstrate that thermoplastic components which include at least 40 wt % polyamide condensation product particles in accordance with the present invention provide significant improvement in the 0° compressive strength as compared to Comparative Example 1. In order to obtain the additional benefit of CAI values of 60 and over, it is preferred that at least 95 wt % (preferably 100 percent) of the thermoplastic particles be polyamide condensation particles in accordance with the present invention as demonstrated in Example 1.

Comparative Examples 2-8

Comparative prepregs (C2 to C8) were prepared in the same manner as Example 2 using IM10 fibers. The formulations for the comparative matrices are set forth in TABLE 5. Rislan PA11 particles are made from polamide11 and are available commercially from Arkema. The Rislan PA11 particles had an average particle size of 20 microns.

TABLE 5

| Ingredient | C2 (wt %) | C3 (wt %) | C4 (wt %) | C5 (wt %) | C6 (wt %) | C7 (wt %) | C8 (wt %) |
|---|---|---|---|---|---|---|---|
| GY285 | 17.3 | 17.3 | 16.3 | 16.3 | 17.0 | 17.0 | 17.0 |
| MY0600 | 26.2 | 26.2 | 24.6 | 24.6 | 25.7 | 25.7 | 25.7 |
| MY721 | 10.5 | 10.5 | 9.8 | 9.8 | 10.3 | 10.3 | 10.3 |
| PES 5003P | 15.7 | 15.7 | 14.7 | 14.7 | 15.4 | 15.4 | 15.4 |
| Orgasol 1002 | 4.75 |  |  |  |  | 4.75 | 4.75 |
| Orgasol 3803 |  | 4.75 |  |  |  |  |  |
| Rilsan PA11 |  |  | 4.75 | 7.50 | 7.50 | 6.25 |  |
| SP10L |  |  | 4.75 | 7.50 | 7.50 | 4.75 | 6.25 | 6.25 |
| 3,3-DDS | 20.9 | 20.1 |  | 19.6 | 20.6 | 20.6 | 10.3 |
| 4,4-DDS |  |  | 19.6 |  |  |  | 10.3 |

The cured prepregs were subjected to the same testing procedures as in Examples 2A and 2B. The results are set forth in TABLE 6.

TABLE 6

|  | C2 | C3 | C4 | C5 | C6 | C7 | C8 |
|---|---|---|---|---|---|---|---|
| CAI | 54.9 | 53.7 | 55.5 | 55.2 | 54.5 | 48.8 | 49.3 |
| G1c | 2.2 | 2.0 | 2.3 | 2.4 | 2.1 | 2.2 | 2.4 |
| G2c | 6.3 | 6.1 | 12.0 | 12.0 | 9.1 | 6.9 | 6.6 |
| 0° Comp. Strength (RT/dry) | 259 | 284 | 256 | 277 | 271 | 263 | 256 |
| 0° Comp. Strength 180° C./wet) | 192 | 195 | 154 | 171 | 193 | 170 | 169 |

The comparative examples demonstrate that achieving a high CAI (60 or more) in combination with a high 0° hot/wet compressive strength (over 180) could not be achieved using various combinations of polyamide particles that did not include the polyamide condensation product in accordance with the present invention.

Comparative Example 9

A comparative prepreg (C9) was made in the same manner as Example 1, except that thermoplastic particle component included a blend of SP10L particles and GRILAMIDE TR60 particles in place of GRILAMIDE TR90 particles. GRILAMIDE TR60 is similar to TR90, except that TR60 has an aromatic polymer backbone and TR90 has an aliphatic polymer backbone. The resin formulation for this comparative prepreg is set forth in TABLE 8.

TABLE 8

| C9-Ingredient | Amount (Wt %) |
|---|---|
| Bisphenol-F diglycidyl ether (TY9703) | 22.5 |
| Trifunctional para-glycidyl amine (MY0510) | 22.5 |
| Aromatic diamine curing agent (3,3-DDS) | 19.6 |
| Thermoplastic Toughening Agent (HR1 Densified polyether sulfone) | 23.4 |
| Polyamide particles - GRILAMID TR60 (25 microns) | 7.9 |
| Polyamide particles - Sp10L | 4.1 |

The cured comparative prepreg (C9) was subjected to the same testing as in Examples 1. The CAI was only 54.9, which is relatively low in comparison to Examples 1, 2A and 2B. The G1c and G2c values were acceptable at 2.1 and 8.0, respectively. The 0° compressive strength was an acceptable 255 at room temperature under dry conditions, but dropped to 171 when measured at 180° C. under wet conditions. The hot/wet compressive strength using GRILAMID TR60 is relatively low in comparison to Examples 1, 2A and 2B which use GRILAMID TR90 in accordance with the present invention.

Comparative Example 10

Comparative prepreg (C10) was prepared in the same manner as Example 2A with the only difference being that Trogamid CX7323 was used in place of TR90 to make polyamide particles. Trogamid CX7323 contains the same polyamide as TR90, except that both $R_1$ in the amine component are hydrogen instead of methyl.

The cured comparative prepreg (C10) was subjected to the same testing as in Examples 1 and 2. The CAI was only 49.6, which is relatively low in comparison to Example 2A. The G1c and G2c values were 2.2 and 7.5, respectively. The 0° compressive strength was 279 at room temperature under dry conditions and dropped to 185 when measured at 180° C. under wet conditions. The CAI is much lower when Trogamid CX7323 is used in place of GRILAMID TR90 even when the polyamide particle component contains as little as 43 weight percent GRILAMID TR90. It is expected that the CAI will also be much lower when Trogamid CX7323 is used in place of larger relative amounts of TR90 in the polyamide particle component.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited by the above-described embodiments, but is only limited by the following claims.

What is claimed is:

1. A pre-impregnated composite material comprising:
A) carbon fibers; and
B) a matrix resin impregnated into said carbon fibers, said matrix resin comprising:
a) a resin component comprising from 20 wt % to 25 wt % bisphenol-F diglycidyl ether, based on the total weight of said matrix resin, and from 20 wt % to 25 wt % triglycidyl-p-aminophenol, based on the total weight of said matrix resin;
b) a thermoplastic particle component comprising at least 95 wt %, based on the weight of said thermoplastic particle component, thermoplastic particles that comprise at least 95 wt % of a polyamide which is the polymeric condensation product of 1,10-decane dicarboxylic acid and an amine component having the formula

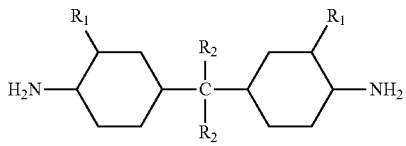

Where both $R_2$ are hydrogen and both $R_1$ are methyl and wherein said thermoplastic particle component is present in an amount of from 10 wt % to 15 wt %, based on the total weight of said matrix resin;
d) from 10 wt % to 26 wt % polyether sulphone, based on the total weight of said matrix resin; and
e) from 17 wt % to 22 wt % diaminodiphenylsulphone as a curing agent, based on the total weight of said matrix resin wherein said pre-impregnated composite material, when cured, has a compression after impact of over 60 when tested in accordance with BSS7260 per BMS 8-276.

2. The pre-impregnated composite material according to claim 1 wherein said curing agent is 3,3'-diaminodiphenyl sulphone.

3. A composite part comprising a pre-impregnated composite material according to claim 1 which has been cured.

4. The composite part according to claim 3 for which compression after impact is at least 60 and the wet compression strength at 180° F. is at least 180.

5. A The composite part according to claim 3 wherein said composite part forms at least part of an aircraft primary structure.

6. The method for making a composite part comprising the step of curing a pre-impregnated composite material according to claim 1 in order to make said composite part.

7. The method for making a composite part according to claim 6 wherein the compression after impact of said composite part is at least 60 and the wet compression strength of said composite part at 180° F. is at least 180.

8. The method for making a composite part according to claim 6 wherein said composite part forms at least part of an aircraft primary structure.

9. The pre-impregnated composite material according to claim 1 wherein the amount of said bisphenol-F diglycidyl ether in said resin matrix is equal to the amount of said triglycidyl-p-aminophenol in said resin matrix.

10. The pre-impregnated composite material according to claim 1 wherein said thermoplastic particle component consists of said thermoplastic particles.

11. The pre-impregnated composite material according to claim 1 wherein said thermoplastic particle component consists of said thermoplastic particles.

12. The pre-impregnated composite material according to claim 1 wherein the amount of polyether sulphone present in said matrix resin is from 20 wt % to 26 wt %, based on the total weight of said matrix resin.

13. The pre-impregnated composite material according to claim 12 wherein the amount of said thermoplastic particles present in said matrix resin is 12 wt %, based on the total weight of said matrix resin.

14. The pre-impregnated composite material according to claim 13 the amount of polyether sulphone present in said matrix resin is 23 wt %, based on the total weight of said matrix resin.

15. A method for making a pre-impregnated composite material, said method comprising the steps of:
A) providing carbon fibers; and
B) impregnating said carbon fibers with a matrix resin wherein said matrix resin comprises:
a) a resin component comprising from 20 wt % to 25 wt % bisphenol-F diglycidyl ether, based on the total weight of said matrix resin, and from 20 wt % to 25 wt % triglycidyl-p-aminophenol, based on the total weight of said matrix resin;
b) a thermoplastic particle component comprising at least 95 wt %, based on the weight of said thermoplastic particle component, thermoplastic particles that comprise at least 95 wt % of a polyamide which is the polymeric condensation product of 1,10-decane dicarboxylic acid and an amine component having the formula

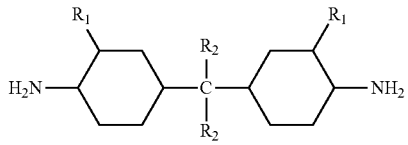

where both $R_2$ are hydrogen and both $R_1$ are methyl and wherein said thermoplastic particle component is present in an amount of from 10 wt % to 15 wt %, based on the total weight of said matrix resin;
d) from 10 wt % to 26 wt % polyether sulphone, based on the total weight of said matrix resin; and
e) from 17 wt % to 22 wt % diaminodiphenylsulphone as a curing agent, based on the total weight of said matrix resin, wherein said pre-impregnated composite material, when cured, has a compression after impact of over 60 when tested in accordance with BSS7260 per BMS 8-276.

16. The method for making a pre-impregnated composite material according to claim 15 wherein the amount of said bisphenol-F diglycidyl ether in said resin matrix is equal to the amount of said triglycidyl-p-aminophenol in said resin matrix.

17. The method for making a pre-impregnated composite material according to claim 16 wherein said thermoplastic particle component consists of said thermoplastic particles.

18. The method of making a pre-impregnated composite material according to claim 15 wherein the amount of polyether sulphone present in said matrix resin is from 20 wt % to 26 wt %, based on the total weight of said matrix resin.

19. The method of making a pre-impregnated composite material according to claim 18 wherein the amount of said thermoplastic particles present in said matrix resin is 12 wt %, based on the total weight of said matrix resin.

20. The method of making a pre-impregnated composite material according to claim 19 the amount of polyether sulphone present in said matrix resin is from 23 wt %, based on the total weight of said matrix resin.

* * * * *